June 8, 1965 G. F. MacFARLANE 3,188,396

FOREIGN EXCHANGE TRUNKING

Filed April 3, 1962 5 Sheets-Sheet 1

INVENTOR.
Gordon F. MacFarlane

BY C. A. Gulbrandsen

Atty.

June 8, 1965 G. F. MacFARLANE 3,188,396

FOREIGN EXCHANGE TRUNKING

Filed April 3, 1962 5 Sheets-Sheet 2

INVENTOR.
Gordon F. MacFarlane
BY C. A. Gullbrandsen
Atty.

INVENTOR.
Gordon F. MacFarlane
BY C. A. Gulbrandsen
Atty.

INVENTOR.
Gordon F. MacFarlane
BY
C. A. Gulbrandsen
Atty.

June 8, 1965 G. F. MacFARLANE 3,188,396

FOREIGN EXCHANGE TRUNKING

Filed April 3, 1962 5 Sheets-Sheet 5

INVENTOR.
Gordon F. MacFarlane

BY C. A. Gulbrandsen
Atty.

United States Patent Office 3,188,396
Patented June 8, 1965

3,188,396
FOREIGN EXCHANGE TRUNKING

Gordon F. MacFarlane, West Vancouver, British Columbia, Canada, assignor to Automatic Electric Laboratories, Inc., Northlake, Ill., a corporation of Delaware Filed Apr. 3, 1962, Ser. No. 184,795
6 Claims. (Cl. 179—18)

The present invention relates to telephone systems and particularly to foreign exchange trunking arrangements for a subscriber located in a first office requiring telephone service in a second office. Specifically it relates to the use of ordinary toll trunking facilities between two offices for the provision of foreign exchange service to a subscriber in one of these offices.

Frequently business telephone subscribers require telephone service to and/or from another telephone exchange other than that exchange from which they would normally receive service. The reasons for this type of service may vary but they usually involve either receipt of a large number of calls from the distant or foreign exchange, a requirement to place many calls in the foreign exchange or they desire to provide incoming service on a local charge basis rather than a toll fee basis to customers or others placing regular calls to the subscriber.

To this end many business telephone subscribers subscribe to foreign exchange trunking service, which provides direct connection to a distant office with the subscriber actually being assigned a directory number or numbers in the distant office. Since the direct connections employ wire, cable or other link facilities on a full time basis the charges for this service are usually based on the distance between the foreign exchange subscriber and the foreign exchange from which he is being served.

While foreign exchange service may be a requisite for many business subscribers, few of these subscribers fully utilize the facilities provided. Actually usage may run as low as 5 or 10% of the available time. Obviously expensive line facilities are thus tied up making this type of service uneconomical to both the subscriber and the telephone operating company.

The usage of commercial toll facilities for this type of service has the disadvantage of either going through a toll operator at the subscriber's local office or if direct distance dialing service is available of dialing an access number, that may include an area code number. Subscribers wishing to reach the business subscriber also have to dial the longer directory number including the special code digits and of course would be billed for a toll call rather than a local call.

In the instant invention circuits and trunking arrangements are provided that provide direct communication between the foreign exchange subscriber and the distant office, requiring no special dialing by the foreign exchange service subscriber or by the subscriber in the distant office who wishes to place a call to the foreign exchange service subscriber. The instant invention also reduces the number of direct line facilities between a group of foreign exchange subscribers and the foreign exchange that serve them by utilizing regular toll circuits on a shared basis with regular toll users.

Accordingly, it is the object of this invention to provide equipment for foreign exchange service that utilizes idle toll circuits between offices rather than direct reserved circuits.

A first feature of this invention is the provision of a line circuit that in response to seizure transmits a series of predetermined digits to seize a local selector in a distant office via regular intertoll dialing facilities.

A second feature of this invention is the provision of an auxiliary line circuit that is connected to a connector bank terminal in a local office, and on seizure by a local subscriber in that office, transmits a series of predetermined pulses to extend a circuit connection to a foreign exchange service subscriber in a distant office via regular intertoll dialing facilities.

A third feature of this invention is the provision of a connector circuit which can be seized via regular intertoll dialing facilities from a distant office and operated to extend a circuit connection to a foreign exchange subscriber.

A final feature of this invention is the inclusion of a preprogrammed impulse sender for use in extending circuit connections to and from foreign exchange subscribers via regular intertoll dialing facilities.

Figure 1:
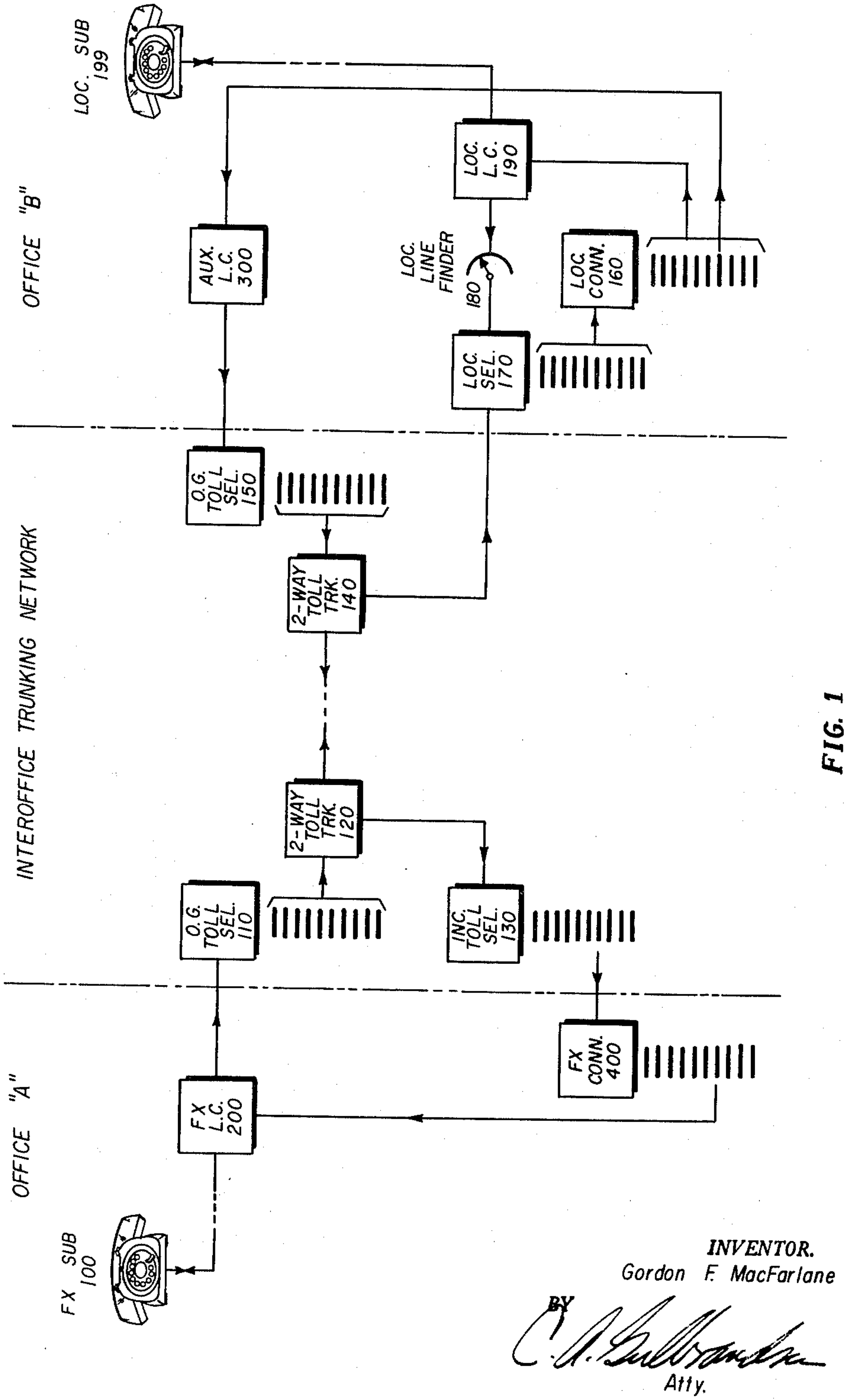
FIG. 1 is a block diagram of a telephone system including a foreign exchange subscriber, local and distant telephone offices, in a trunking arrangement embodying circuits according to this invention.
Figure 2:
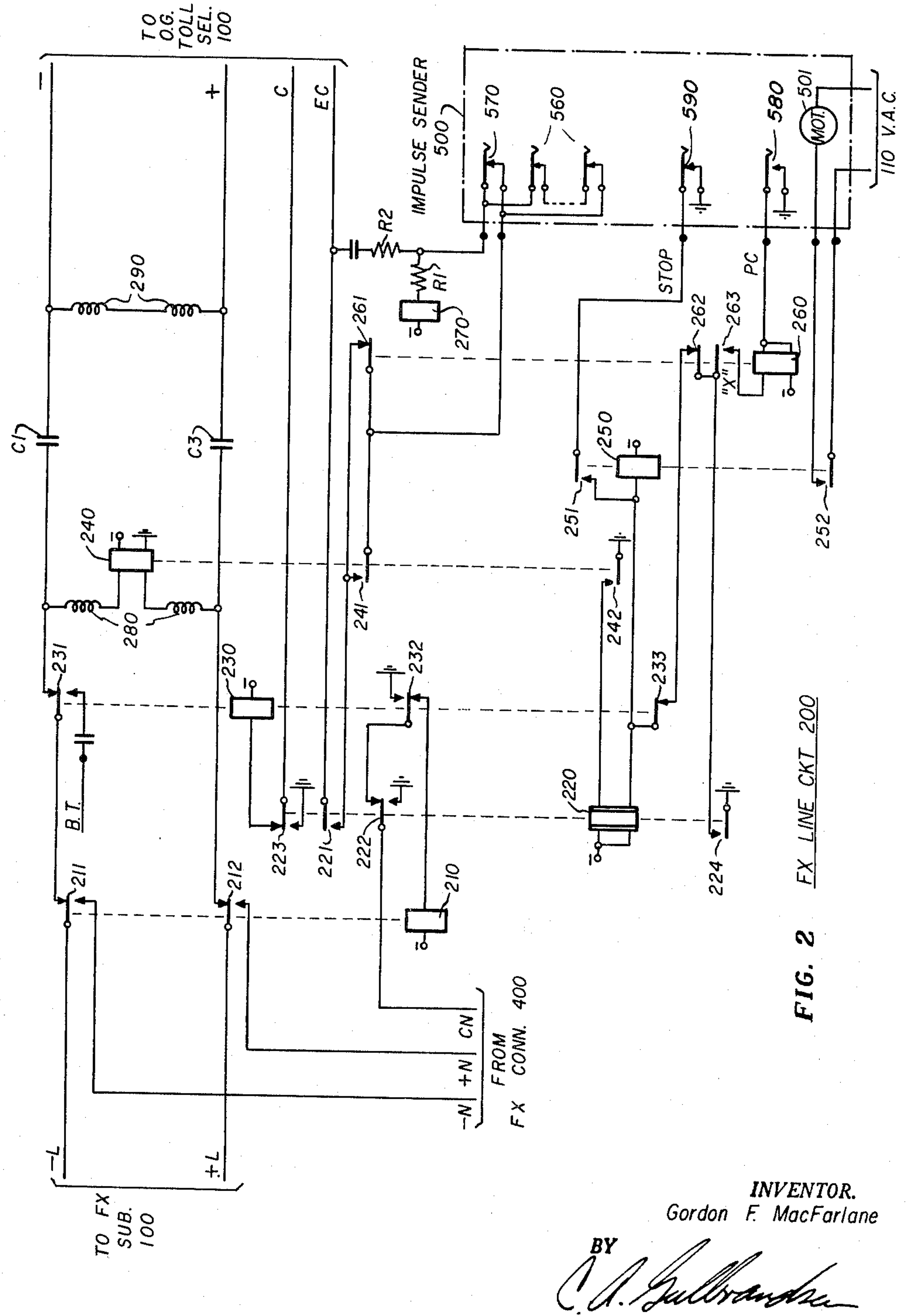
FIG. 2 is a schematic circuit diagram of a foreign exchange line circuit in accordance with this invention.
Figure 3:
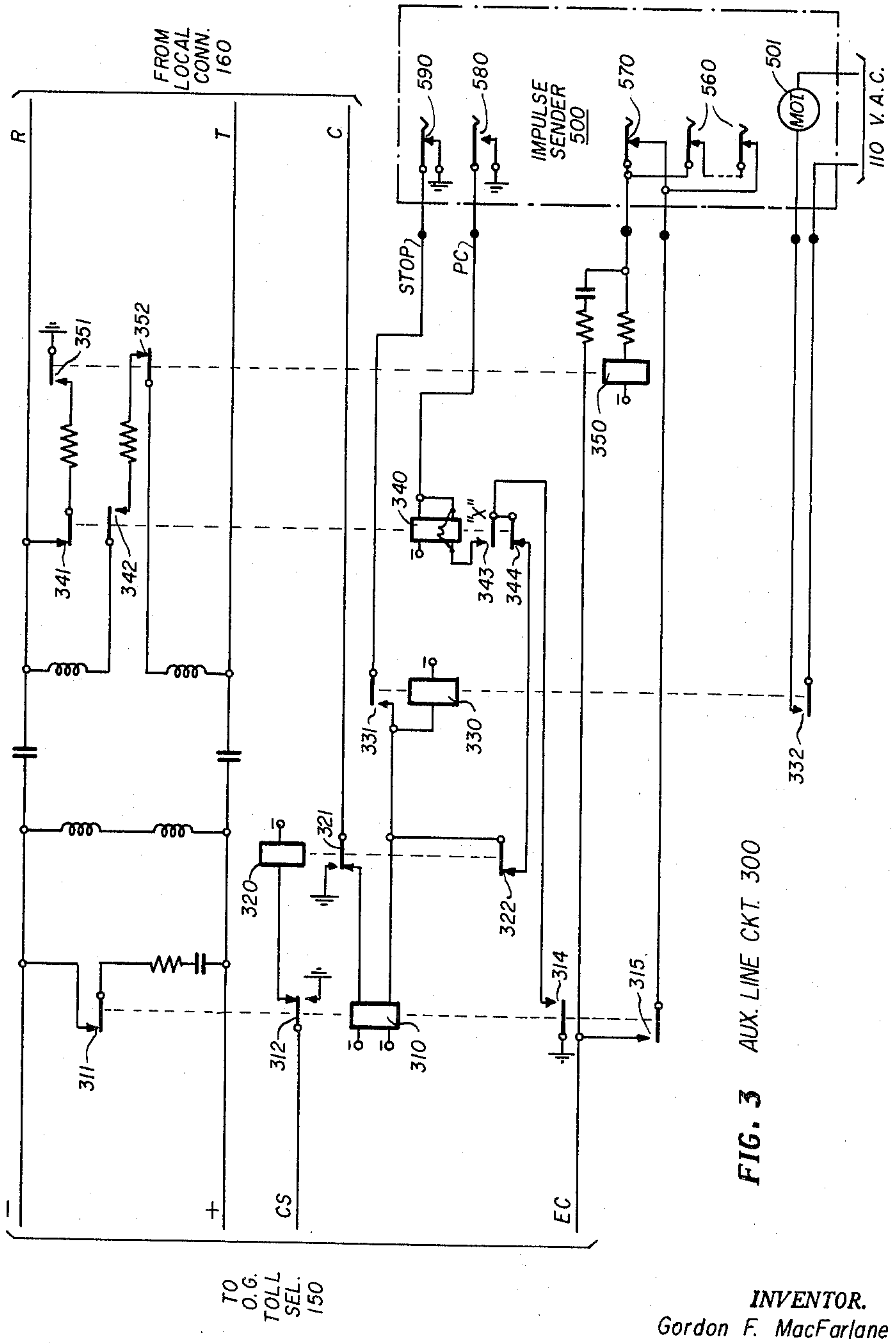
FIG. 3 is a schematic circuit diagram of an auxiliary line circuit in accordance with this invention.
Figure 4:
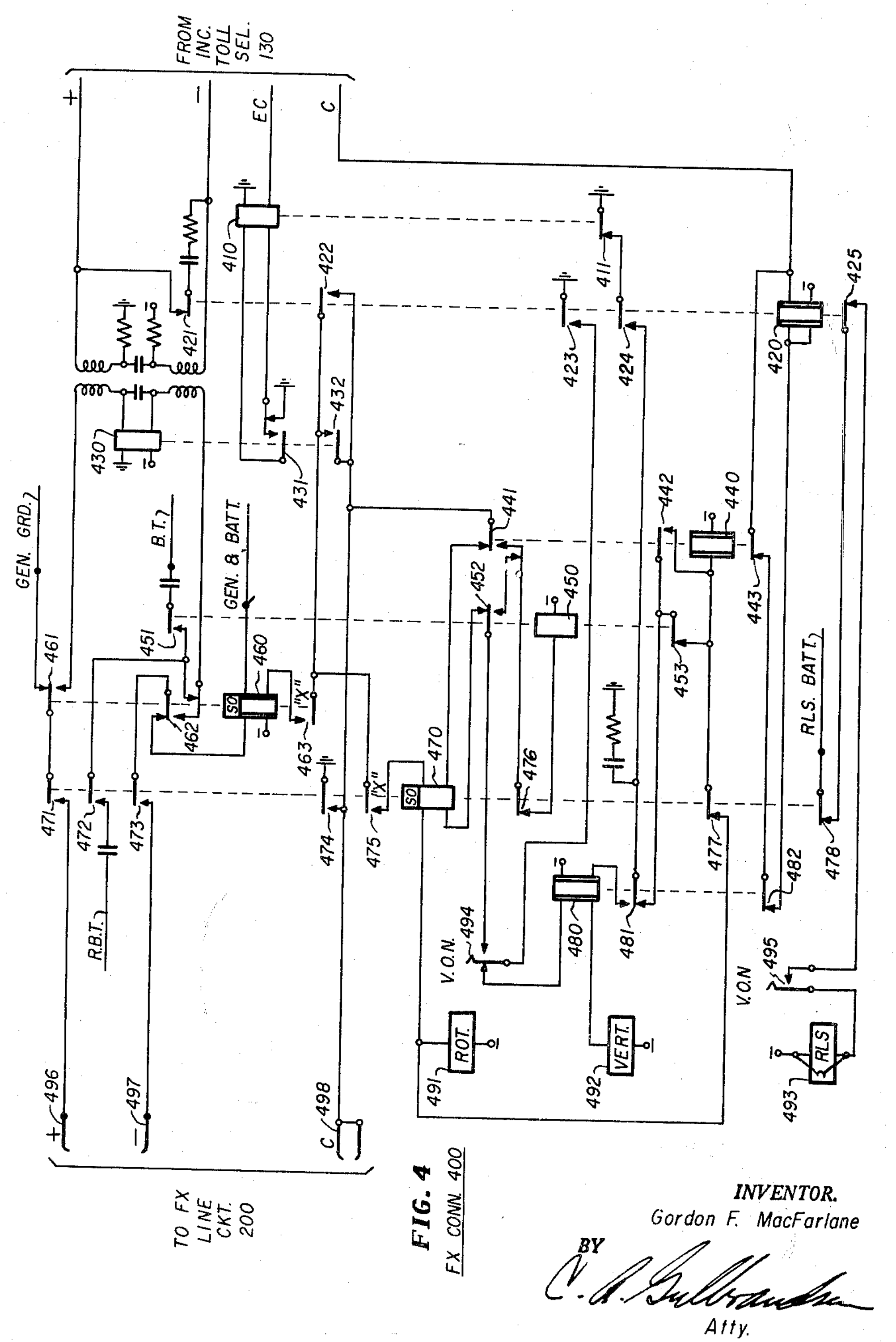
FIG. 4 is a schematic circuit diagram of a foreign exchange connector in accordance with this invention.

FIG. 1 includes two telephone offices shown as office A and office B, showing in elementary form the circuitry required for establishing telephone connection between foreign exchange subscriber 100 located in office A and local subscriber 199 located in office B. The system disclosed in this invention is shown embodied in the Strowger or step-by-step type of offices. This invention however is not limited to this form and as such might be utilized in other types of switching systems. Detailed circuits shown in FIGS. 2, 3 and 4 are designed to operate in four wire switching systems like that disclosed in U.S. Patent 2,881,261 to Imre Molnar issued April 7, 1959. However by minor changes simplex or loop pulsing switch trains could be accommodated.

Referring now to FIGS. 1 and 2 in combination to originate a call foreign exchange subscriber 100 equipped with a conventional subset including hookswitch, handset and dial, lifts the handset and in the usual manner a loop is closed to battery through the upper winding of relay 240, the upper winding of retard coil 280, the break contacts 231 and 211, over the negative side of the line, through the subscribers' instrument hookswitch, back over the positive side of the line through contact 212, the lower winding of the retard coil 280 and the lower winding of relay 240 to ground. Upon completion of this path relay 240 operates, extending ground via contacts 242 to relay 220 at its upper winding. At the same moment a pulsing circuit to the EC lead is prepared by closure of contacts 241. Relay 220 operates extending ground through contacts 224, 262 and 233 to the winding of relay 250 and to the lower winding of relay 220 via the same path causing relay 220 to lock operated, and relay 250 to operate. Operation of relay 220 also places ground at contacts 222 on lead CN to the connector terminal to mark this circuit busy to the connector 400. Ground is extended at contacts 223 to the C lead to seize the following switch 110 in the toll switch train. The pulsing circuit to the EC lead is also completed at contacts 221 by operation of relay 220. Operation of relay 250 completes an operating path to the pulsing device 500 at contacts 252 and also prepares a cease operation path to the stop lead at contacts 251.

Figure 5:
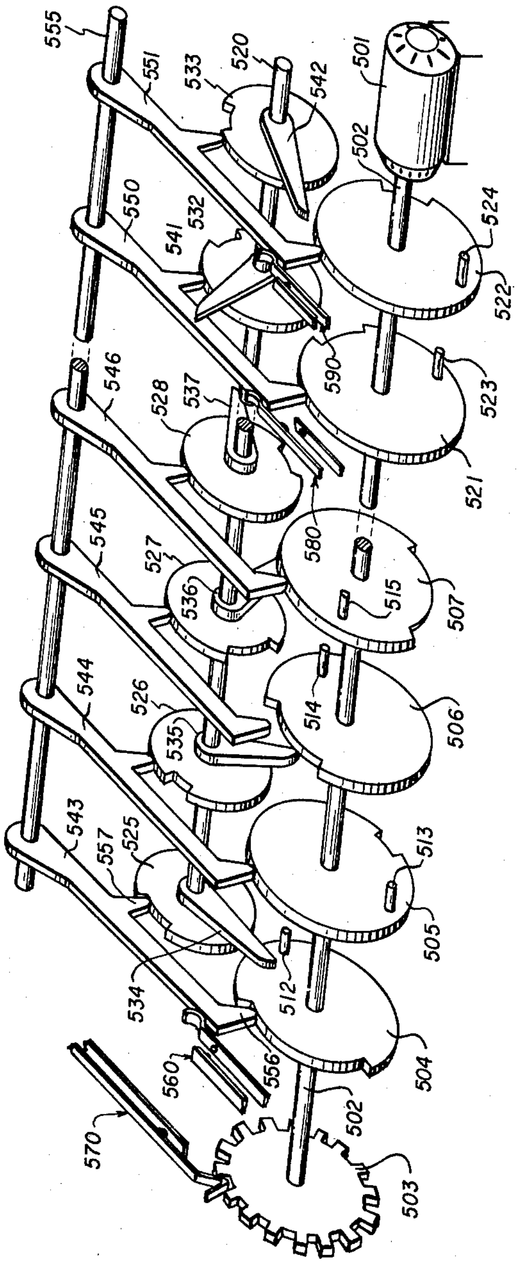
FIG. 5 is a stylized drawing of a mechanical impulse sender usable in a system in accordance with this invention.

While the impulsing sender may take any well known form such as a strapped rotary switch, a magnetic tape memory device, a ferrite core or other solid state memory unit for the purposes of this disclosure it is shown as a mechanical sender. Operation of this sender may be understood by reference to FIG. 5. Impulse sender 500 is a motor driven mechanical sender capable of generating from one to seven predetermined digits as used to provide the routing directives necessary to establish the connection between the two stations in the foreign exchange trunking system.

The sender is powered by a small motor 501 having an output speed of approximately 38 revolutions per minute. The drive shaft 502 which rotates at this speed is equipped with the following: an impulse disc 503 having 16 teeth. This disc actuates a set of impulse springs which produce a continuous stream of pulses at approximately 10 pulses per second. Seven impulse counting discs 504–507 and 508–511 (not shown) each have their circumference divided into 16 segments. The outer portion of up to 10 of these segments is cut out. The length of the cutout corresponds to the value of the digit to be sent. Each disc is equipped with a stud 512–515 and 516–519 (not shown) which is used to drive an auxiliary shaft 520 whose purpose will be described later. The disc 521 is used to mark the completion of sending. The length of the cut-out in this disc is arbitrarily two segments. This disc 521 will be required if less than seven impulse counting discs are used. Another disc 522 which is identical to 521 opens the A.C. supply to the motor 501 when the drive shaft assembly reaches the home position.

The auxiliary shaft is equipped with 9 selector cams 525–528, 529–531 (not shown) and 532 and 533 as well as positioning arms 534–537, 530–540 (not shown), 541 and 542. The auxiliary shaft is mounted parallel to the main drive shaft 502. Cams 525–533 are positioned such that their cut-outs are progressively displaced ⅛ of a revolution with respect to each other. The positioning arms 534–542 which are actuated by the studs 512, 513 etc. on the impulse counting discs are also positioned with progressive displacements of ⅛ revolution.

Associated with each of the impulse counting discs 504–510 and selector cams 525, 526 etc. is a sensing finger 543–546, 547–549 (not shown), 550 and 551. These fingers are mounted on shaft 555. Each sensing finger has two detents; 556 for example which rests on the impulse counting disc, and the other 557 for example which rests on the selector cam. Each sensing finger controls a pair of contacts like 560 shown in connection with sensing finger 543. The remaining contact sets are for the impulse counting discs not shown for the sake of clarity in the drawing. These contacts are all connected in series and the combination is connected in parallel with the impulsing springs 570 as shown in FIGS. 2 and 3.

To understand the operation of the impulse sender let us assume that the digits to be sent are 7, 1, 3, 4, the operation would be as follows: after one-half revolution of the drive shaft 502 to allow the motor to reach full speed sensing finger 543 drops into the cut-outs on impulse disc 504 and selector cam 525. This removes the short circuit at springs 560, across the impulse springs 570, the impulse disc 503 produces 7 pulses after which the end of the cut-out in the impulse disc 504 is reached. The detent 556 on sensing finger 543 rides up the radial face of the cut-out on impulse disc 504. This lifts the finger and replaces the short circuit on the impulse springs 560.

Main shaft 502 now rotates $\frac{6}{16}$ of a revolution (600 milliseconds) during which time the stud 512 on impulse disc 504 strikes the positioning arm 534 causing the auxiliary shaft 520 to rotate ⅛ revolution. This places the output on selector cam 526 directly below the rear detent on sensing finger 544. At the end of the 600 milliseconds (which constitute the interdigital pause) impulse disc 505 reaches a position which permits sensing finger 544 to drop and remove the short circuit across impulse spring 570 once again, after one impulse sensing finger 544 is lifted by impulse disc 505. In the next 600 milliseconds the auxiliary shaft is again rotated to prepare for the third digit. The sequence is the same for each succeeding digit.

After all four digits have been sent the contacts 580 which mark the completion of pulsing which would be associated with finger 550 close momentarily, grounding lead PC. The motor 501 continues to run until the home position is reached at which time ground is removed by opening of the contacts 590 associated with finger 551 from the stop lead releasing relay 330 to the auxiliary foreign exchange line circuit 300 or relay 250 in the foreign exchange line circuit 200 which opens contacts 332 or 252 respectively to stop the impulse sender motor 501.

The impulsing device operates the impulsing springs 570 as previously described to transmit the required predetermined digits for operation of the various switches in the intertoll train, seize the required trunk to the distant point and subsequently operate the switchgear in the distant office. As noted momentary ground from the pulsing device 500 is placed on lead PC and operates relay 260 at its "X" contacts 263. This operation locks relay 260 to ground via contacts 224 on relay 220 as well as removing ground from relay 250 at contacts 262. Operation of relay 260 is also effective to remove the short across the pulsing contacts 241 of relay 240 by opening contacts 261.

Upon hearing dial tone from the distant office the foreign exchange subscriber dials the desired number in the distant office. Relay 240 follows the dial pulses repeating them to the succeeding switches in the switch train via the EC lead. The pulsing circuit extends from battery through relay 270, impulse springs 570, pulsing springs 241, contacts 221 to the EC lead. Should the subscriber attempt to dial before the automatic pulsing is complete the relay contacts remain shorted by contacts 261 of relay 260 rendering dial pulsing by the subscriber of relay 240 ineffective. When the local subscribed in the distant office answers, conversation may commence.

Upon completion of the call the foreign exchange subscriber hangs up. The loop to relay 240 previously outlined is opened, relay 240 releases opening the circuit to relay 220 at contacts 242. Relay 220 now releases and in so doing removes operating ground at contacts 224 from relay 260. The line circuit 200 is now available for additional calls.

To trace an incoming call to the foreign exchange line, reference is made to FIGS. 1 and 3. A local subscriber 199 in the distant office wishing to place a call to the foreign exchange subscriber 100 dials the appropriate directory number so that the local switch train in the distant office functions in the usual manner until a circuit connection is made to the local connector terminal assigned for the foreign exchange line.

The auxiliary line circuit 300 is marked idle to the local connector 110 by the presence of resistance battery through the upper winding of relay 310, contacts 321 extended to the C lead. When seized, ground is extended from the connector over the C lead through the above traced path to relay 310 causing relay 310 to operate. Relay 310 locks through contacts 314, 344 and 322 to ground. Ground over the same path is extended to relay 330 and ground is placed at contacts 312 on lead CS to seize an intertoll circuit. The pulsing circuit to lead EC is closed at contacts 315. Termination for the transmission path is opened at contacts 311. Operation of relay 330 completes an operating path for the pulsing device 500 at contacts 332 and also completes a path for resistance ground from the pulsing unit at contacts 331. Relay 330 locks over this path to ground. The impulse sender 500 now generates the necessary predetermined digits to provide the routing directives necessary to establish the connection to the foreign exchange subscriber. Upon seizure of the line in the office associated with the foreign exchange subscriber, ground is returned via the EC lead, contacts 315 to relay 350. Relay 350 operates to place resistance ground via contacts 351, 341 to the — lead to trip the ringing.

The connection is extended in accordance with the predetermined digits transmitted by the impulse sender 500 through the intertoll trunking facilities in a well known manner with the call being extended through the toll selector 130 to the special foreign exchange connector 400 shown in detail in FIG. 4. Connector 400 is marked idle to preceding equipment by the presence of resistance battery through relay 420 on the C lead. When seized ground is extended from the connector over the C lead to operate relay 420 and battery is extended over the EC lead to operate relay 410. Relay 410 operates opening its pulsing contacts 411 and relay 420 operates removing the line termination at contacts 421 and extends ground through contacts 423 to relay 480 and also extends an operating path to relay 440. Relay 480 operates and extends an operating path from ground through contacts 481 through the lower winding of relay 480 and to the vertical magnet 492. Operation of relay 480 also changes the resistance battery on the C lead from its present 500 ohms to 1500 ohms by removing the shunt path around upper winding of relay 420 at contacts 482.

The dial pulses are received over the EC lead from the intertoll switch train, relay 410 follows the dial pulses. When at normal ground is extended to the lower windings of relay 480 and vertical magnet 492, in series. Vertical magnet 492 follows the pulses from relay 410 and steps the wipers 496, 497 and 498 to the desired level. With the first vertical step, vertical off normal springs 494 operate opening the operating path to the upper winding of relay 480. Relay 480 is slow to operate however and remains operated during pulsing. After the last pulse of the digit, relay 410 operates and opens an operating path to the lower winding of relay 480 and vertical magnet 492. Vertical magnet 492 restores and after its slow to release period relay 480 also restores, restoring a circuit to relay 440 and rotary magnet 491 at contacts 481.

Relay 410 again follows the pulses of the next digit and when at normal an operating path from ground through conatcts 411, 424, 481, 453 to relay 440 is complete as is the path to the rotary magnet 491 through the same path but also including contacts 477. The rotary magnet 491 operates, stepping the wipers 496, 497, 498 to the desired bank contacts in accordance with the pulses received over the EC lead from the intertoll switch train and extended by means of operation of relay 410. From the first pulse relay 440 operates completing a path from wiper 498 through contacts 441 and 476 to relay 450. Relay 440 is slow to release and therefore remains operated during pulsing. After the last pulse of the digit relay 410 reoperates opening the operating path to relay 440 and rotary magnet 491 at contacts 411. The rotary magnet 491 restores. During the slow to release period of relay 440 the line is tested for a busy condition.

If the called line is busy, ground from the connector terminal via wiper 498 operates relay 450 through a path extending from the wiper through contacts 491 and contacts 476. Relay 450 operates returning a locking circuit at contacts 452 and opens the pulsing circuit at contacts 453 to prevent further stepping of the switch. After its slow to release period relay 440 restores thus extending holding ground to contacts 441 and relay 450. Busy tone is returned to the subscriber via contacts 451 and the negative side of the line.

If the called line is idle resistance battery is encountered by wiper 498. Relay 470 operates at its X contacts 475 and then operates completely to a path extending from battery through the rotary magnet 491, the upper winding of relay 470, X contacts 475, contacts 422 and contacts 424 to lock to ground. Operation of relay 470 extends generator ground at contacts 471 to the positive side of the line, through wipers 496. Generator battery is supplied through the upper winding of relay 460, contacts 462, contacts 473 and to the negative side of the line through wiper 497. Ringback tone is also extended back to the calling party via contacts 472, 462 and the negative side of the line to the intertoll switch train.

Further pulsing is prevented by opening the pulsing path at contacts 477 and ground is placed on the wiper 498 at contacts 474 and a release circuit is opened at contacts 478 from release battery. The interrupted generator operates the ringer, through the above-mentioned path, at the called station. Relay 460 is slow to operate and will not operate on alternating current received from generator battery through its upper winding.

When the called party at the foreign exchange subscriber station answers, a dirct current loop is closed to the upper winding of relay 460. Relay 460 operates at its X contacts 463 and operates fully through its lower winding removing the ringing generator at contacts 461 and 462 from the wipers 496 and 497, disconecting ringback tone at contacts 462. A loop is now closed through to relay 430 causing it to operate at contacts 431. Operation of relay 430 is effective to extend resistance ground back over the EC lead for answer supervision as well as providing a multiple path across contacts 422 at contacts 432 for release conditions.

The release from a completed call is accomplished as follows: relays 410, 420, 470, 460 and 430 are operated so that when the called party disconnects first the loop to relay 430 is opened. Relay 430 restores returning 250 ohm ground on the EC lead for disconnect supervision. When the calling party disconnects the circuits to relays 410 and 420 are open, relays 410 and 420 restore opening the operating paths to relays 460 and 470. When relays 460 and 470 restore connections to the positive and negative wipers 496 and 497 respectively are removed and relay 470 is effective at its contacts 478 to extend release battery through contact 425 and vertical off normal spring 495 to release magnet 493. The release magnet operates and releases the switch shaft. As the shaft returns to normal, the vertical off normal springs operate and open the release magnet. The release magnet restores and the circuit is now at normal.

If the calling party disconnects first relays 410 and 420 are opened, relay 410 restores returning ground over contacts 411, 424, 481 and 453 to relay 440 causing it to operate. Relay 440 operates and after its slow to release period relay 420 restores opening the path to relay 440. Relay 440 likewise restores after its slow to release period.

When the called party disconnects, the loop through relay 430 is opened. Relay 430 restores opening the operating paths to relays 460 and 470. Restoration of relays 460 and 470 disconnect the circuits from the wipers 496 and 497 respectively, relay 470 restores connecting release battery at contacts 478 to the release magnet 493 causing it to operate. Operation of release magnet 493 releases the switch shaft and as the switch shaft returns to normal the vertical off normal springs 495 operate to open the release magnet. The release magnet now restores with the circuit returning to normal.

It the calling party at the distant office would encounter a busy condition upon hanging up the circuit is opened to relays 410 and 420. Relay 410 restores. Relay 420 restores after its slow to release period opening the operating path to relay 450 also closing the path to the release magnet at contacts 425. Relay 450 restores disconnecting the busy tone lead at contacts 451 from the negative side of the line. Release magnet 493 operates releasing the switch shaft. As the shaft returns to normal the vertical off normal springs 495 operate and open the release magnet. The release magnet restores leaving the circuit at normal.

What is claimed is:

1. In a telephone system a first exchange including switching means and a called station, a second exchange including a calling station; switching means and control means individual to said calling station connected between said calling station and said second exchange switching means, said control means operated in response to an "off-hook" condition at said calling station to automatically operate said second exchange switching means to extend a connection to said first exchange switching means, said first exchange switching means controlled by the calling device at said calling station over said connection to further extend said connection to said called station.

2. In a telephone system, a first exchange including switching means and a called station, a second exchange including a calling station, switching means connected to said calling station, and control means, said second exchange switching means controlled by the calling device at said calling station to extend a connection to said control means, said control means operated in response to extension of said connection to automatically extend said circuit connection to said first exchange switching means and automatically operate said first exchange switching means to further extend said connection to said called station.

3. In a telephone system: a first telephone office including a local switch train, and a local subscriber station including incoming circuit connections from said local switch train; an interoffice network including outgoing circuit connections to said local switch train; a second telephone office including a foreign exchange subscriber station, a foreign exchange line circuit individual to and accessed by said foreign exchange subscriber and having outgoing circuit connections to said interoffice network, means in said foreign exchange line circuit operated in response to seizure by said foreign exchange subscriber station to operate means in said interoffice network to extend an operating path through said interoffice network to said local switch train; means in said local switch train controlled by said foreign exchange subscriber station over said operating path to further extend said operating path to said local subscriber station.

4. In a telephone system: a first telephone office including a local switch train, and a local subscriber station including incoming circuit connections from said local switch train; an interoffice network including a plurality of switching means and outgoing circuit connections to said local switch train; a second telephone office including a foreign exchange subscriber station, a foreign exchange line circuit including an impulse sender individual to and accessed by said foreign exchange subscriber and having outgoing circuit connections to one of said plurality of switching means in said interoffice network, said impulse sender operated in response to seizure of said foreign exchange line circuit by said foreign exchange subscriber station to transmit a predetermined series of pulses to said first switching means in said interoffice network to operate said switching means to extend an operating path through said interoffice network to said local switch train; means in said local switch train controlled by said foreign exchange subscriber station over said operating path to further extend said operating path to said local subscriber station.

5. In a telephone sytem: a first telelphone office including a local switch train, a local subscriber station including outgoing circuit connections to said local switch train, and an auxiliary line circuit accessed by said local switch train; an interoffice network including circuit connections from said auxiliary line circuit; a second telephone office including a foreign exchange subscriber station, and a foreign exchange connector having access to said foreign exchange subscriber station and including incoming circuit connections from said interoffice network; means in said local switch train controlled over said incoming circuit connections by said local station to extend an operating path from said local station to said auxiliary line circuit, means in said auxiliary line circuit operated in response to extension of said operating path from said local switch train to said auxiliary line circuit to operate means in said interoffice network to extend said operating path through said interoffice network to said foreign exchange connector and operate means in said foreign exchange connector to further extend said operating path to said foreign exchange subscriber station.

6. In a telephone system: a first telephone office including a local switch train, a local subscriber station including outgoing ciruit connections to said local switch train, and an auxiliary line circuit including an impulse sender accessed by said local switch train; an interoffice network including a plurality of switching means, one of said switching means including circuit connections from said auxiliary line circuit; a second telephone office including a foreign exchange subscriber station, and a foreign exchange connector having access to said foreign exchange subscriber station and including incoming circuit connections from said interoffice network; means in said local switch train controlled over said incoming circuit connections by said local station to extend an operating path from said local station to said auxiliary line circuit, said auxiliary line circuit impulse sender operated in response to extension of said operating path by said local switch train to said auxiliary line circuit to transmit a predetermined train of pulses to said one of said switching means in said interoffice network, said one of said switching means operated in response to said pulses to extend said operating path through said interoffice network to said foreign exchange connector and operate means in said foreign exchange connector to further extend said operating path to said foreign exchange subscriber station.

References Cited by the Examiner

UNITED STATES PATENTS

| | | |
|---|---|---|
| 2,006,438 | 7/35 | Carpenter. |
| 2,409,063 | 10/46 | Ostline. |
| 2,554,115 | 5/51 | Molnar. |
| 2,618,708 | 11/52 | Ostline. |
| 2,678,353 | 5/54 | Ostline. |
| 2,885,481 | 5/59 | Lomax. |
| 2,867,690 | 1/59 | Parks. |

ROBERT H. ROSE, *Primary Examiner.*

WALTER L. LYNDE, *Examiner.*